Feb. 5, 1946.    G. W. COON    2,394,152
MEANS FOR MAGNETIC TESTING
Filed Oct. 10, 1942

Inventor
GRANT W. COON.
by Charles W. Hills Attys.

Patented Feb. 5, 1946

2,394,152

UNITED STATES PATENT OFFICE 2,394,152

MEANS FOR MAGNETIC TESTING

Grant W. Coon, Chicago, Ill., assignor to Magnaflux Corporation, Chicago, Ill., a corporation of Delaware Application October 10, 1942, Serial No. 461,528

5 Claims. (Cl. 175—183)

This invention relates to improvements in means for magnetically testing a piece of paramagnetic material to denote the location and approximate size of hidden faults or defects in the piece under test. The invention is highly desirable for the magnetic testing of relatively small parts, although the principles of the invention are adaptable for the testing of larger parts, as will be apparent to one skilled in the art.

In the manufacture of various types of equipment and machinery it is highly desirable to know in advance whether a part used in such equipment or machinery has a hidden fault or defect therein, and this is especially true where the particular part undergoes a strain when in use. The magnetic testing of such parts quickly and accurately discloses not only the location but the approximate size of such hidden faults if any exist. It has frequently been the practice in such testing to induce or set up a magnetic field longitudinally of the test piece, apply paramagnetic particles to the surface of the test piece, and examine the patterns formed by these particles. The longitudinal magnetizing field will denote faults extending in a generally transverse direction relatively to the test piece. The test piece is then magnetized circularly, and again paramagnetic particles applied to denote faults extending generally longitudinally of the test piece. Thus, it has frequently been necessary to go through two entire operations in order to adequately test a part, each operation including the magnetization of the part in one direction and the application of paramagnetic particles.

Because testing, while in most cases is essential, is something extra to the actual manufacture of the part, and contributes nothing toward the making of the part, it is of course desirable that the testing be done as rapidly as possible and with as little labor as possible so that the parts may be economically produced. This is especially true in connection with relatively small parts such, for example, as airplane bolts. If the cost incident to testing can be materially reduced, the economy of manufacture may be held at a minimum.

With the foregoing in mind, it is an important object of the instant invention to provide a magnetic testing system which eliminates a complete magnetizing operation and a separate inspection operation while fully testing a paramagnetic part for faults.

Another object of the invention is the provision of a magnetic testing system capable of exceedingly rapidly and accurately testing small items in quantity.

Another feature of this invention resides in the provision of a magnetic testing system or arrangement in which a part may be tested for both longitudinal and transverse fault indications in a single operation.

It is also a feature of the invention to provide a magnetic testing system or arrangement which gives the benefit of a plurality of separate magnetic fields in different directions with only a single magnetizing and inspection operation.

Still a further object of the invention resides in the provision of a magnetic testing system or arrangement in which the magnetic field produced in a part under test snaps sharply back and forth many times a second from longitudinal to circular magnetization and is not a vector resultant of separate applied fields.

The invention also provides a magnetic testing system arranged to give added mobility to the paramagnetic particles used in the testing.

Still another object of the invention resides in the provision of a magnetic testing system utilizing alternate half wave rectified current.

Another object of the invention resides in the provision of a magnetic testing system in which only a single transformer need be used as a source of power for the testing apparatus and the test piece is magnetized both circularly and longitudinally with separate fields in a single operation.

It is also an object of the invention to provide a new and novel method of magnetizing and magnetically testing a paramagnetic part.

While some of the more salient features, characteristics and advantages of the instant invention have been above pointed out, others will become apparent from the following disclosures, taken in conjunction with the accompanying drawing, in which.

As shown on the drawing.

Figure 1:
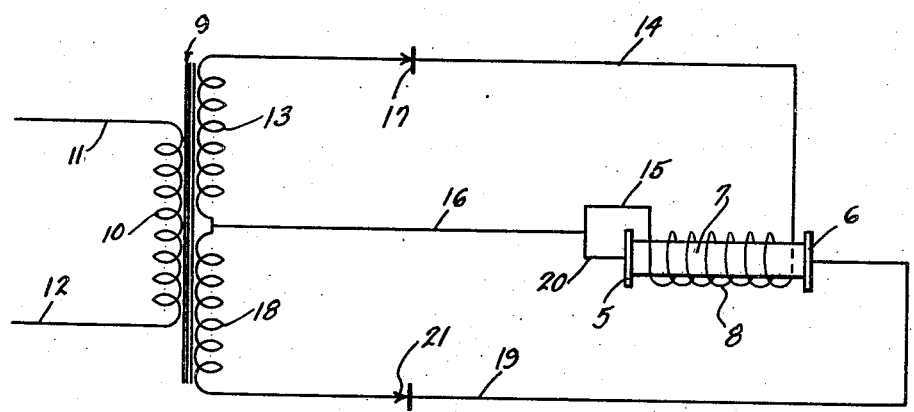
Figure 1 is a diagrammatic view of magnetic testing apparatus with its conjunct electrical circuit connections, embodying principles of this invention.

In that illustrated embodiment of the instant invention seen in Figure 1, there is shown a pair of spaced contact plates 5 and 6 which may be made of copper or any other suitable electrically conductive material. A test piece 7 is supported between the contact plates in such a manner that current may flow from one contact plate to the other longitudinally through the test piece and thus induce a circular magnetizing field within the said piece. Any paramagnetic part may be utilized as a test piece, such as an airplane bolt, a rivet, a shaft, etc.

Disposed around the test piece is a coil 8 which, when energized, will induce a magnetization field extending longitudinally of the test piece. Upon the application of paramagnetic particles to the test piece, these particles will assume a pattern on the outer surface of the test piece, and where a hidden fault occurs within the test piece there will be smaller patterns of definite outline denoting the approximate location and size of the fault. Circular magnetization of the test piece resulting from current passing from one of the contact plates to the other through the test piece will cause the paramagnetic particles to denote a fault extending generally longitudinally of the test piece, while longitudinal magnetization resulting from energization of the coil 8 will cause the particles to indicate a fault generally transversely of the test piece. Obviously, obliquely disposed faults will be denoted by one or the other of the magnetization fields, the indications resulting from one of the fields usually being stronger than that resulting from the other, depending upon the angle of the fault.

The method embodied in the instant invention involves the rapid alternate establishment of longitudinal and circular magnetizing fields within the test piece. This is accomplished by passing each alternate half wave of an alternating current through the coil 8, and passing the intermediate half waves in rectified condition through the contact plates 5 and 6 and the test piece 7 therebetween. Thus, a pulsating current is passed through the coil and a pulsating current is also passed longitudinally through the contact plates and test piece. Both pulsating effects are obtained from the same alternating current, and there will be a pulsation through the coil, another pulsation through the test piece, and so on. Thus, if 60 cycle current is used, the magnetization within the test piece alternates every $\frac{1}{120}$ of a second.

This method is distinctly different from previous schemes or systems for simultaneous or successive longitudinal and circular magnetization within a test piece, in that the magnetic field produced in the test piece by virtue of this invention snaps sharply from longitudinal to circular with great rapidity and is not a vector resultant of two applied magnetizing fields. Practically, there might be a phase difference between the two current applications, which would result in some overlap, so that for a portion of one pulsation current might be flowing through the test piece and also through the coil 8. Such a condition, however, would tend to give even better results than if the pulsating effect did not overlap.

Sometimes in magnetic testing the paramagnetic particles applied to a magnetized test piece are applied in a dry state, and at other times these particles are carried in a liquid bath. The alternations of the magnetic field in the test piece 7 are so fast that any indication formed by these paramagnetic particles will not be disturbed nor will the particles be washed off from the flow of liquid over the test piece. At the end of the alternate half wave current application indications of fault in either direction will be brought out as well or better than if separate magnetizing and inspection operations were made on the piece.

Thus, it will be seen that by the practice of the present method it is not necessary to set up a magnetizing field in one direction through a test piece, then apply paramagnetic particles to inspect for fault, then set up a magnetizing field in the other direction in the test piece, and follow that with another application of paramagnetic particles to inspect for fault. With the practice of this method it is only necessary to once magnetize the part or test piece, apply the magnetic particles either in a wet or dry condition while the magnetizing current is being applied, and a full inspection of the piece sufficient to denote faults in either direction is at once had. The paramagnetic particles will remain in the patterns they assumed during the current application after the supply circuit has been opened.

In putting this method to practice, only a single transformer need be utilized as an exciting transformer for establishing the desired magnetizing fields within the test piece. With reference again to Figure 1 it will be seen that a core type transformer generally indicated by numeral 9 may be used. This transformer includes a primary 10 which may be connected by the line conductors 11 and 12 to a suitable source of alternating current. The transformer is provided with a single secondary of which a portion 13 is connected through conductor 14 to the coil 8 and through conductors 15 and 16 back to an intermediate point of the secondary winding. In conductor 14 is a uni-directional electrical valve 17 preferably in the form of a half wave rectifier either of the dry plate type or the tube type.

The other portion 18 of the secondary winding of the transformer 9 is connected through conductor 19 to the contact plate 6, and a conductor 20 connects the other contact plate 5 with the common return 16 to the intermediate point of the secondary winding. In conductor 19 a similar uni-directional valve 21 is connected.

Figure 2:
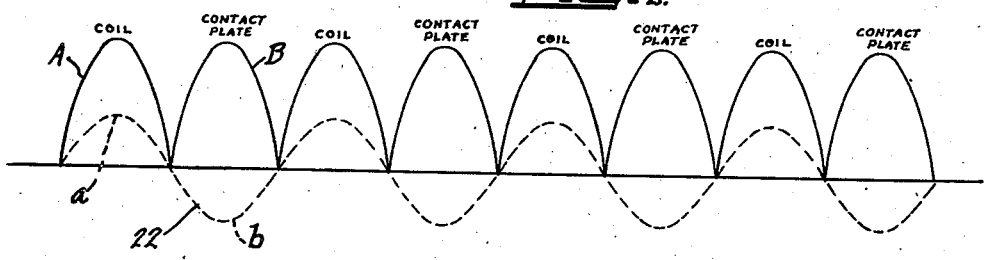
Figure 2 is a diagrammatic showing of the application of a sine wave alternating current to the apparatus of Figure 1 in the form of alternate half wave pulsations.

Now, assuming that the apparatus and circuit connections are established just as they appear in Figure 1, and that the line conductors 11 and 12 are energized, there will be an alternating current induced in the secondary of the transformer 9. This current is indicated diagrammatically by the dotted line 22 in Figure 2. The first half wave portion of this current, designated $a$, passes through conductor 14 and valve 17, through the coil 8, and back to the secondary through conductors 15 and 16, thus energizing the coil 8 and establishing a longitudinal magnetic field within the test piece 7. In Figure 2 I have indicated this pulsating half wave current to the coil 8 as A. While this first current half wave A is passing through the coil 8, the valve 21 in conductor 19 prevents the passage of current in a reverse direction, that is, first through the common conductor 16 and the test piece, and thence through conductor 19 back to the transformer secondary, so that there is no current flow through the test piece to set up circular magnetization. The second current half wave, designated $b$ in Figure 2, which will be in the opposite direction from the half wave $a$, passes through the valve 21, conductor 19, contact plate 6, test piece 7, contact plate 5, and conductors 20 and 16 to the intermediate point of the secondary winding. This half wave will be rectified or inverted by the rectifier 21 so that it may be indicated in the shape designated B in Figure 2. As this rectified half wave passes directly through the test piece, the rectifier or valve 17 prevents a reverse flow of current through the coil 8 so that only a circular magnetizing field is set up within the test piece.

This operation continues with a current half wave through the coil and then a current half wave through the test piece for each cycle of alternating current. Thus the magnetization of the test piece alternates from longitudinal magnetization to circular magnetization, and vice versa, many times every second, depending upon the number of cycles in the exciting current. Thus, in effect, a pulsating current is passed through the coil 8, and a pulsating current is also passed through the test piece with the pulsations of both these currents alternating with each other. Such pulsating currents will have a high peak value, and when compared with equivalent alternating current or pure direct current these high peak values of the half wave pulsating current give an added advantage in that they show up surface cracks in the test piece in almost direct proportion to the instantaneous peak value of current. While, as stated above, there might be some overlap in the pulsations under certain circumstances, nevertheless there will not be a vector resultant of the two alternatively applied magnetic fields, but there will be a series of sharp changes from one magnetic field to the other.

While the test piece is being given its "shot," paramagnetic material may be applied to it either in the dry or wet form and indications of faults extending in either direction within the test piece will be brought out.

As long as the half wave pulsations are so phased that the magnetizations alternate, it is not necessary to use a single transformer for supplying both half wave circuits, and it is not necessary that these valves or rectifiers 17 and 21 be both of the same character. One valve may be a dry plate type of rectifier while the other may be a rectifier tube. For economy and simplicity, however, a single transformer will suffice and like rectifiers or valves may be used.

Figure 3:
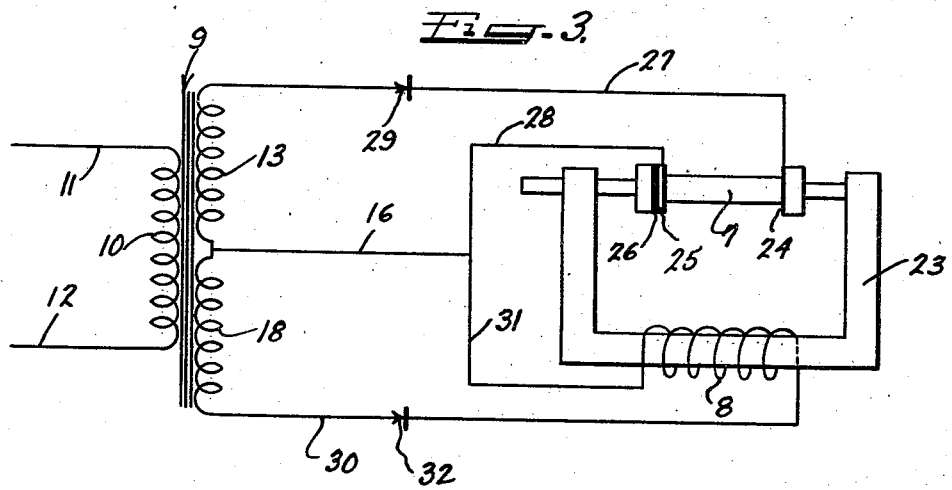
Figure 3 is a view similar in character to Figure 1 but illustrating a more commercial form of apparatus.

In Figure 3 I have illustrated a more commercial form of apparatus, namely, one in which the test piece does not have to be located within the magnetizing coil. In this instance a supporting structure of a shape to define a flux path is provided, a supporting yoke 23 of paramagnetic material being illustrated which carries adjustable contact plates 24 and 25, one of these contact plates being insulated electrically from the remainder of the yoke as indicated at 26. The test piece 7 may be supported between the contact plates 24 and 25. The coil 8, in this instance, is disposed around one of the legs of the yoke 23 where it may remain permanently in position while the test pieces are freely placed, tested, and removed from between the contact plates.

Merely to illustrate that it does not matter which portion of the transformer secondary is connected to the coil or to the contact plates, I have shown the secondary portion 19 connected through conductor 27 to the contact plate 24, and conductor 28 connects contact plate 25 to the common return 16. Likewise, conductor 30 connects the secondary portion 18 to the coil 8, and conductor 31 connects the coil with the common return 16. A valve 29 is included in the conductor 27 and a similar valve 32 is included in the conductor 30 just as is the case with the showing in Figure 1.

The operation is the same as previously described, with the single exception that the longitudinal magnetization set up by the energization of coil 8 is effective across the insulated gap 26.

It will, of course, be appreciated that while the instant invention has been illustrated and described, for purposes of clarity and specific example, in connection with circular and longitudinal magnetization of a test piece, the invention is not so specifically limited. For example, if a relatively thin square or rectangular piece were to be tested it would probably be better to set up separate "longitudinal" fields at right angles to each other in the piece. Circular magnetization of such a piece would not be necessary. Consequently, it will be noted that the invention includes the establishment of a plurality of magnetic fields of different orientation in a test piece, be any of the fields circular, longitudinal, or otherwise.

From the foregoing, it is apparent that I have provided novel means for and a method of magnetizing and magnetically testing a paramagnetic part. By the arrangement and the novel method embodied in this invention, a separate magnetizing operation and a separate inspection operation are entirely eliminated, and the piece under test may be fully magnetically inspected for faults in a single magnetizing and testing operation. By this invention the effective benefit of a plurality of magnetizing fields of different but constant orientation in a test piece is acquired at one and the same time, and consequently the test pieces may be completely inspected with great rapidity. It will be appreciated that the apparatus may be operated and the method practiced with great economy as to cost of apparatus and current consumption.

It will, of course, be understood that various details of construction may be varied through a wide range without departing from the principles of this invention, and it is, therefore, not the purpose to limit the patent granted hereon otherwise than necessitated by the scope of the appended claims.

I claim as my invention:

1. In a magnetic testing system, contact members for engagement with a test piece, a coil to longitudinally magnetize the test piece, an exciting transformer, a circuit arrangement connecting a portion of the secondary of said transformer with said contact members, a circuit arrangement connecting the other portion of said secondary with said coil, and a unidirectional electrical valve in each of said circuit arrangements, said valves being arranged to pass current through their respective circuit arrangements only during opposite halves of the cycle of an alternating current in the secondary of said transformer to thereby energize said contacts and said coil alternately when said secondary is energized.

2. In a magnetic testing system, means which when energized will set up a magnetic field in a test piece, means which when energized will set up another magnetic field of different orientation in the same test piece, and an electrical circuit incorporating both said means and arranged to cause rapid and alternate energization of said means by passing like half-waves of an alternating current through one of said means and the other and alternative like half-waves of the same current through the other of said means.

3. In a magnetic testing system, a pair of spaced contacts between which a test piece may be disposed, a coil for producing longitudinal magnetization in the test piece, a transformer of which the primary may be energized from a suitable source of alternating current, outside conductors leading from the ends of the transformer secondary, a common return leading to an intermediate part of said secondary, said contacts being connected between an outside conductor and said common return, said coil being connected between the other outside conductor and said common return, and a unidirectional electrical valve in each of said outside conductors, said valves being arranged to pass current through their respective conductors only during opposite halves of the cycle of an alternating current in said secondary to thereby energize said contacts and said coil alternately when said secondary is energized.

4. In a magnetic testing system, contact plates between which a test piece may be mounted, a coil for magnetizing the test piece longitudinally, and an electrical circuit arranged to pass like half-waves of an alternating current through said plates and the test piece therebetween and the other and alternate like half-waves of the same current through said coil.

5. In a magnetic testing system, means for association with a test piece and which when energized will longitudinally magnetize the test piece, means for association with the same test piece and which when energized will circularly magnetize the test piece, and an alternating current circuit incorporating both said means and valved to pass every other half-wave of current only through one of said means and the alternative half-waves of the same current only through the other of said means.

GRANT W. COON.